United States Patent [19]
Werth et al.

[11] 3,960,597
[45] June 1, 1976

[54] METHOD FOR FABRICATING ELECTROCHEMICAL CELLS

[75] Inventors: John Werth, Princeton, N.J.; Dell A. Crouch, Langhorne, Pa.; Jack C. Sklarchuk, Trenton, N.J.

[73] Assignee: ESB Incorporated, Philadelphia, Pa.

[22] Filed: June 9, 1975

[21] Appl. No.: 585,022

[52] U.S. Cl. .......................... 136/6 FS; 136/6 LF; 136/20; 136/83 T; 136/155; 136/176
[51] Int. Cl.² ................................... H01M 10/00
[58] Field of Search ................ 136/83 T, 6 F, 6 FS, 136/6 LF, 20, 153, 155, 176

[56] References Cited
UNITED STATES PATENTS

| | | | |
|---|---|---|---|
| 3,847,667 | 11/1974 | Werth | 136/6 FS |
| 3,877,984 | 4/1975 | Werth | 136/83 TX |

*Primary Examiner*—John H. Mack
*Assistant Examiner*—C. F. LeFevour
*Attorney, Agent, or Firm*—Anthony J. Rossi; Robert H. Robinson

[57] ABSTRACT

High temperature secondary cells having a molten salt or fused salt electrolyte are fabricated in ambient atmosphere. Such cells typically have an electrolyte, a positive reactant or a negative reactant which are capable of reacting with moisture or oxygen contained in the atmosphere. The ingredients or materials comprising the positive and negative reactants and the electrolyte are processed in a state in which they do not react significantly with moisture or oxygen in the ambient atmosphere. Thereafter, they are electrically charged in the positive reactant compartment of a cell container at the operating temperature of the cell whereby the negative reactant of the cell is provided in the negative reactant compartment of the cell container and a positive reactant-electrolyte melt is provided in the positive reactant compartment of the cell container.

11 Claims, 1 Drawing Figure

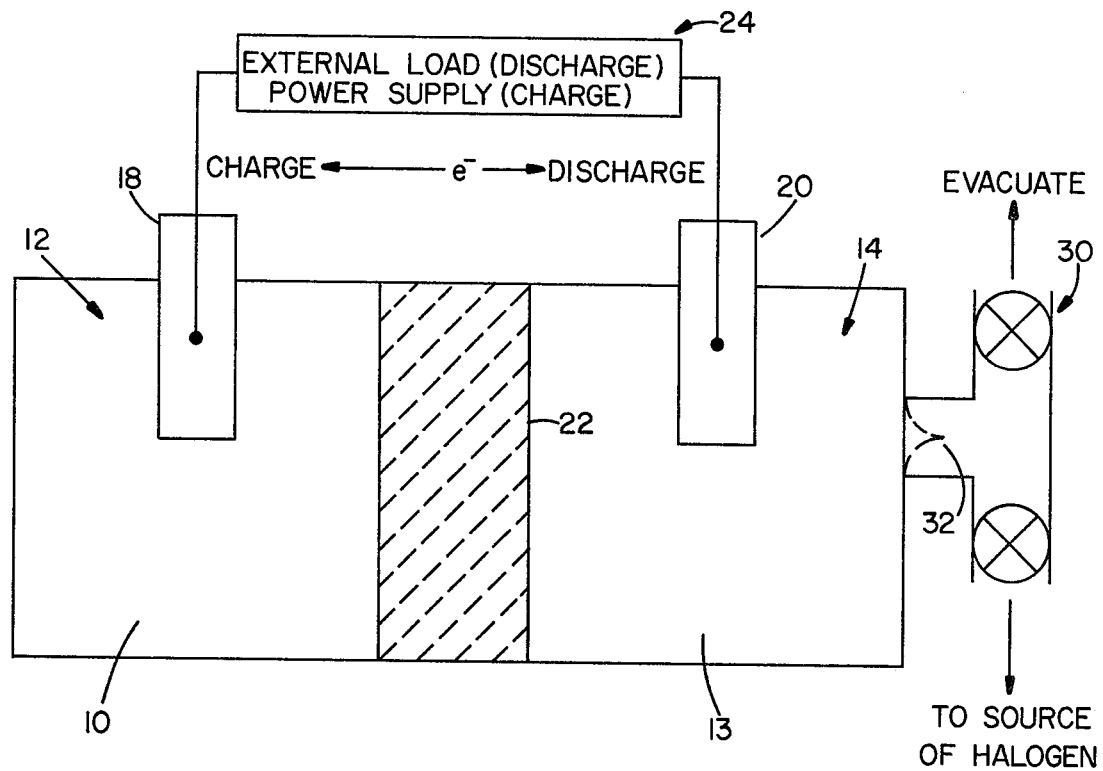

METHOD FOR FABRICATING ELECTROCHEMICAL CELLS

BACKGROUND OF THE INENTION

1. Field of the Invention

This invention relates to methods for fabricating electrochemical cells and more particularly to methods for fabricating high-temperature secondary electrochemical cells or batteries which utilize molten or fused salt electrolytes.

One such secondary battery utilizes an alkali metal negative reactant, a metal chloride positive reactant which is in contact with a molten alkali metal chloro aluminate electrolyte and a beta alumina derivative separator. This battery is fully described in U.S. Pat. No. 3,877,964 which is assigned to the same assignee as the instant application. The present invention will here be described in most detail in association with the battery of U.S. Pat. No. 3,877,964 since the method in accordance with the invention has been particularly developed for use therewith; however, the method may be utilized in other high-temperature secondary batteries in which the electrolyte or the positive reactions are more sensitive to atmospheric handling than their elemental constituents, or any such battery in which the negative reactant is more sensitive to atmospheric handling than its cations in the electrolyte, or combinations thereof.

2. Description of the Prior Art

It may be explained here that a substantial amount of work has been done in the development of high-temperature secondary electrochemical cells and that the use of molten or fused salts as electrolytes in secondary batteries is not new to the art. Such batteries utilizes as the electrolyte an inorganic salt composition which is solid and non-conducting at ordinary temperatures. However, when the cell is activated by heating it to a temperature sufficiently high to fuse or melt the electrolyte, the molten electrolyte becomes conductive so that electrical energy may be withdrawn from or fed into the cell. Secondary batteries of this type are known for their high energy storage and power output capabilities.

One of the problems associated with batteries utilizing molten or fused salt electrolytes is that generally the positive and negative reactants or the electrolyte or a combination of these constituents making up the batteries are difficult to handle in the production of the batteries because one or more of these materials may react deleteriously with oxygen or moisture in the atmosphere. Thus, controlled atmospheric conditions must be maintained during fabrication of such batteries. For example, in the battery disclosed in U.S. Pat. No. 3,877,964, the constituents making up the battery may comprise a molten sodium negative reactant, an antimony chloride positive reactant, a beta alumina separator and a molten sodium chloroaluminate electrolyte on the positive reactant side of the separator. In the assembly of this battery, a suitable container is filled with sodium metal in the negative reactant compartment and the positive reactant materials or ingredients, in their charged state, are placed in the positive reactant compartment. This means that controlled atmospheric conditions have to be used, that is, no oxygen or water can be present in the atmosphere where the batteries are assembled. Consequently, such batteries must be assembled in glove boxes or other artificial environments having no oxygen or water present in the atmospheres thereof. It can be readily seen that these procedures are not very suitable for large scale production and that they are expensive and time consuming.

Therefore, in view of the above, it is a primary object of the present invention to provide a method for fabricating high-temperature secondary electrochemical cells under substantially ordinary open bench working conditions.

This and other objects and advantages of the present invention will become more apparent in the following detailed description of the preferred embodiment of the invention taken in conjunction with the accompanying drawing.

SUMMARY OF THE INVENTION

In the broadest aspect of this invention, the method for fabricating a high temperature secondary cell in which the electrolyte, the positive reactant or the negative reactant thereof are capable of reacting with moisture or oxygen contained in the atmosphere comprises the following steps: A first mixture comprising carbon, aluminum metal powder and an alkali metal halide is prepared. This mixture is reacted with a halogen while the mixture is heated to a suitable reaction temperature. To the halogen-reacted ingredients, aluminum metal powder and one or more materials which will form the positive reactant of the cell from the group consisting of metals at least as noble as aluminum, metal-like elements, and sulfur are added to form a second mixture. A cell container is provided having positive and negative reactant compartments, a solid member separating the cell compartments which is selectively-ionically conductive with respect to cations of the negative reactant material of the cell, and current collectors for each cell compartment. While maintaining the cell at its operating temperature, the second mixture is electrically charged in the positive reactant compartment of the cell container whereby the negative reactant of the cell comprising a molten alkali metal is provided in the negative reactant compartment of the cell container and a positive reactant-electrolyte melt is provided in the positive reactant compartment of the cell container.

In accordance with the method of the invention, the need for a dry artificial atmosphere for fabricating high temperature secondary cells of the type here contemplated is eliminated and such cells can be fabricated in the ambient atmosphere.

DESCRIPTION OF THE DRAWING

The FIGURE is a diagrammatic illustration of a fused or molten salt battery useful to explain the method in accordance with the invention.

DESCRIPTION OF THE PREFERRED EMBODIMENT

Before explaining the present invention in detail, it is to be understood that the invention is not limited in its application to the particular construction and arrangement of parts illustrated in the accompanying drawing, since the invention is capable of other embodiments and of being practiced and carried on in various ways. Also, it is to be understood that the phraseology or terminology employed herein as well as in the examples given hereinafter are for the purposes of description only and not limitation.

Referring now to the figure, a single cell secondary battery is diagrammatically shown having a negative reactant cell compartment 10 which may be made of any suitable material or materials which are not attached by molten alkali metal at the operating temperature of the cell (about 150° to about 225°C), e.g. carbon steel, aluminum, certain ceramics, certain heat and chemical resistant polymers, a suitable glass or an alpha alumina or derivative thereof, all thermally insulated with fiberglass, rockwool or other insulation. Inside compartment 10 is a molten alkali metal negative reactant 12, e.g. sodium. Inside a positive reactant compartment 13 is a carbon, alkali metal haloaluminate electrolyte — metal halide positive reactant melt 14, e.g. sodium chloroaluminate — trichloride melt.

Other useful materials from which the positive reactants can be formed in accordance with the present invention include metals at least as noble as aluminum, metal-like elements, and sulfur. By metal-like elements, it is meant elements such as boron, silicon, selenium, arsenic, tellurium and antimony which are also known as metalloids and which are intermediate in properties between typical metals and non-metals.

Other useful materials from which the electrolytes can be formed in accordance with the present invention include alkali metal halides other than sodium chloride, as for example, bromides, fluorides, chlorides or iodides of sodium, lithium or potassium. All of these alkali metal halides will form the corresponding alkali metal haloaluminate electrolytes of the invention.

The carbon powder in the melt 14 serves the purpose of a dispersed current collector. The positive ractant compartment 13 may be made of any suitable material such as glass, ceramic, teflon, tungsten and the like. Current collectors 18 and 20 are disposed within the negative and positive reactant compartments 10 and 13, respectively, and may be made of any suitable material such as for example, tungsten wire, carbon rods and the like. A solid separating member 22 is disposed between the compartments 10 and 13. The separating member is selectively ionically-conductive to alkali metal cations and may be made of any suitable material such as for example beta alumina or its derivatives. The current collectors 18 and 20 provide means for connecting the cell with an external circuit 24 which closes the circuit of the cell. The external circuit 24 may include any suitable utilization device or load, voltmeter, ammeter, etc., which have not been shown other than as indicated in the figure.

During the operation of the battery the temperature of the carbon, alkali metal haloaluminate electrolyte-metal halide positive reactant melt is maintained at a temperature sufficient to insure that the salt electrolyte is molten. Both the specific energy and the potential of the cell will vary with the particular couple used in a specific battery. If for example, a sodium-cupric chloride couple is used, the theoretical yield will be about 470 Whrs/lb. of reactant and the theoretical potential will be about 3.5v. If the couple is a sodium-ferric chloride couple, the theoretical yield would be about 360 Whrs/lb. of reactant with the theoretical potential being about 2.3v, while the theoretical yield for a sodium-antimony trichloride couple would be about 375 Whrs/lb. of reactant with the theoretical potential being about 3.1v.

The present invention provides a method that allows all solid ingredients required in the battery to be introduced in the compartments 10 and 13 under ambient atmospheric conditions.

A better understanding of the method of the invention can be obtained from the following examples.

In Example I, a sodium/beta alumina/sodium chloroaluminate-antimony chloride battery was fabricated using the method in accordance with the invention.

EXAMPLE I

A mixture of carbon, aluminum powder and ethylene glycol was prepared. The carbon used was Vulcan XC-72R from the Cabot Corp. of Boston, Mass. This form of carbon is very conductive and fluffy (at about 5% of theoretical density). The aluminum powder was from Fisher Scientific of Pittsburgh, Pa., having a size of −20 to +100 mesh, and the ethylene glycol was reagent grade obtained from the J. T. Baker Co. of Phillipsburg, N.J.

The mixture was compacted or pelletized in a press and thereafter the ethylene glycol was removed from the so-formed pellets by heating them to a temperature in the range of from about 225° to 275°C. The pellets were then cooled to room temperature. The ethylene glycol was added to the mixture of carbon and aluminum powder as a binder material and was chosen because it is chemically inert to the other materials of the mixture and because it could be readily evaporated after the pellets were formed. Other suitable materials having these properties could be utilized as a binder material. The purpose of the compacting or pelletizing just described was to render the volume of the dry carbon and to bring the aluminum and carbon into intimate contact.

Sodium chloride was then added to the cooled pellets to form a second mixture. The proportions of the second mixture were 70 weight percent sodium chloride, 14 weight percent carbon and 16 weight percent aluminum metal powder. This second mixture was placed in a flask having a gas inlet tube sealed to the top thereof. The flask and second mixture were then weighed.

The flask was evacuated via the inlet tube and then chlorine gas was introduced through the gas inlet to back fill the flask with chlorine gas. It should be pointed out here that at this point in the method of the invention a halogen other than chlorine gas could be used depending on the reactants and electrolyte of the cell. While continuing the flow of chlorine gas, the flask was heated to 160°C. and the temperature was gradually raised from 160° to 230°C. These temperatures were sufficient to cause salt or salts to start being formed, i.e. aluminum chloride was formed and thereafter, it reacted with the sodium chloride to form the required low melting 150°C. composition, i.e., sodium chloroaluminate in different proportions in accordance with the following equations:

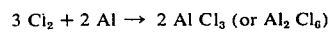

$$3\ Cl_2 + 2\ Al \rightarrow 2\ AlCl_3\ (or\ Al_2Cl_6)$$

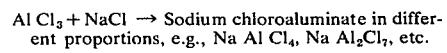

$AlCl_3 + NaCl \rightarrow$ Sodium chloroaluminate in different proportions, e.g., $Na\ AlCl_4$, $Na\ Al_2Cl_7$, etc.

The chlorine gas was continued until substantially all of the aluminum in the flask reacted with chlorine.

The flask and materials contained therein were then cooled to room temperature and re-weighed. The difference in weight was the amount of chlorine which had reacted with the aluminum. Since the weight of the aluminum was known, the theoretical weight of chlorine (equal to 63 weight percent of the dry mixture)

required to react completely could be calculated. The weight obtained was found to substantially agree with the theoretical value.

The materials of the flask were then transferred to the positive reactant compartment of a cell, e.g. compartment 13 of the figure. It should be pointed out here that the foregoing operative manipulative steps could have been carried out in the first instance in the compartment 13 of the figure and not in a flask or separate container. The figure shows generally and diagrammatically at 30 an arrangement for evacuating the air from and introducing the chlorine gas into the compartment 13. Also shown diagrammatically in the figure at 32 in dotted line is a seal, the purpose of which will become apparent hereinafter.

Aluminum metal and antimony metal were added to the compartment 13 of the cell in such amounts as to create during electrochemical charging a slight excess of sodium over that needed in subsequent discharge of the cell. The purpose of the extra sodium is to keep the wall on the negative side of the beta alumina separator 22 in contact with sodium at all times during normal cell operation. The amounts of proportions of aluminum metal and antimony added to compartment 13 were 95 weight percent antimony and 5 weight percent aluminum.

The air was then evacuated from compartment 13 and the cell sealed. The cell was then heated to the operative temperature of the cell, approximately 190° to 210°C. Thereafter, electrical connections were made to the leads 18 and 20 and the cell charged electrically from a suitable source of power shown generally at 24 in the figure. A constant voltage charge was applied for four days at 3.5v with a current limit equal to the 7 hour rate of the cell. The cell was then discharged at the 16 hour rate. At the beginning of charge, for convenience, there was a slight amount of sodium present in the negative reactant compartment 10 to establish electrical contact between the current collector 18 and the separator 22. However, it should be pointed out that graphite could have been used for establishing this electric contact between the current collector 18 and the separator 22. During charge, ions of sodium contained in the positive reactant compartment 13 were transferred to the negative reactant compartment 10 to provide the negative reactant material of the cell, that is, sodium. In the positive reactant compartment, only sodium chloroaluminate, antimony chloride (the positive reactant of the cell) and the conductive carbon remained at the end of the charge period.

The cell's performance showed that all of the metal reactants had been converted to chloride salt or salts, and that the coulombic efficiency was virtually 100%.

The proportions of aluminum, sodium chloride, chlorine, carbon, and antimony used in this example are illustrative of the proportions that could be used in larger cells.

EXAMPLE II

A molten salt battery in accordance with the invention may be as follows:

Vulcan XC-72R carbon is mixed with aluminum powder having a size of −20 to +100 mesh and ethylene glycol. The mixture may be compacted or pelletized in a press and thereafter the ethylene glycol removed from the so-formed pellets by heating them to a temperature in the range of from about 225° to 275°C. The pellets are then cooled to room temperature.

Sodium chloride can then be added to the cooled pellets to form a second mixture. This second mixture is then placed in a flask having a gas inlet tube sealed to the top thereof.

The flask is evacuated via the inlet tube and then chlorine gas is introduced through the gas inlet to back fill the flask with chlorine. While continuing the flow of chlorine, the flask is heated to about 220°C. The chlorine flow is continued until substantially all of the aluminum in the flask has reacted with chlorine.

The flask and materials contained therein are then cooled to room temperature.

The materials of the flask may then be transferred to the positive reactant compartment of a cell, e.g. compartment 13 of the figure. It should again be pointed out here that the foregoing operative manipulative steps may also be carried out in the first instance in the compartment 13 of the figure and not in a flask or separate container.

Aluminum metal and sulfur may then be added to compartment 13 of the cell in such amounts as to create during electrochemical charging a slight excess of sodium over that needed in subsequent discharges of the cell. The purpose of the extra sodium is again to keep the wall on the negative side of the beta alumina separator 22 in contact with sodium at all times during normal cell operation. The amounts or proportions of aluminum metal and sulfur to be added to compartment 13 may be approximately 60wt% sulfur and 40wt% aluminum.

Air is then evacuated from compartment 13 and the cell may then be sealed. The cell is then heated to its operating temperature of approximately 190°C. to 210°C. Thereafter, electrical connections are made to the leads 18 and 20 and the cell charged electrically, as in Example I, from a suitable source of power shown generally at 24 in the figure. A constant voltage charge is then applied at about 3.5 volts.

EXAMPLE III

A molten salt battery in accordance with the invention may be made as follows:

Vulcan XC-72R carbon is mixed with aluminum powder having a size of −20 to +100 mesh and sodium chloride, which mixture is then placed in a flask having a gas inlet tube sealed to the top thereof.

The flask is evacuated via the inlet tube and then chlorine is introduced through the gas inlet to back fill the flask with chlorine gas. While continuing the flow of chlorine, the flask is heated to at least 300°C, or higher depending on the desired reaction rate. The chlorine flow is continued until substantially all of the aluminum in the flask has reacted.

The flask and materials contained therein are then cooled to room temperature.

The materials of the flask may then be transferred to the positive reactant compartment of a cell, e.g. compartment 13 of the figure. It should again be pointed out here that the foregoing operative manipulative steps may also be carried out in the first instance in the compartment 13 of the figure and not in a flask or separate container.

Aluminum metal and antimony may then be added to compartment 13 of the cell in such amounts as to create during electrochemical charging a slight excess of sodium over that needed in subsequent discharges of the cell. The purpose of the extra sodium is again to keep the wall on the negative side of the beta alumina separator 22 in contact with sodium at all times during normal cell operation. The amounts or proportions of aluminum metal and antimony to be added to compartment 13 may be approximately 95% arsenic and 5% aluminum.

Air is then evacuated from compartment 13 and the cell may then be sealed. The cell is then heated to its operating temperature of approximately 190°C. to 210°C. Thereafter, electrical connections are made to the leads 18 and 20 and the cell charged electrically, as in Example I, from a suitable source of power shown generally at 24 in the figure. A constant voltage charge is then applied at about 3.5 volts.

The method of the invention is not unique solely to cells utilizing sodium as the negative reactant, beta alumina as the separator, or sodium chloroaluminate as the molten electrolyte. The method can be used, in principle, in other cells in which the electrolyte or the positive reactants are more sensitive to atmospheric handling than some of their starting materials, or cells in which the negative reactant is more sensitive to atmospheric handling than its product in the electrolyte, or combinations thereof. As for example, the method of the invention can also be used in the battery described in U.S. Pat. No. 3,847,667. In that case, the elemental antimony in the method given herein is not used as it is not present in the battery of U.S. Pat. No. 3,847,667. Another example in which the method of the invention can be utilized is in the Sodium-Aluminum Halide, Sulfur Battery described in co-pending U.S. patent application Ser. No. 585,021 filed on even date herewith and assigned to the assignee of the subject application.

From the foregoing, it will be understood that the method of the invention permits the fabrication of molten salt batteries without the necessity of handling reactants and/or electrolytes which are sensitive to moisture and/or oxygen.

The foregoing detailed description has been given for clarity of understanding only and no unnecessary limitations are to be understood therefrom. The invention is not limited to exact details shown and described for obvious modifications will occur to one skilled in the art.

Having thus described our invention, we claim:

1. A method for fabricating a high-temperature secondary cell in which the electrolyte, the positive reactant or the negative reactant thereof is capable of reacting with moisture or oxygen contained in the atmosphere comprising the steps of:
   A. preparing a first mixture comprising carbon, aluminum metal powder and an alkali metal halide;
   B. reacting a halogen with the mixture of step (A) while simultaneously heating the mixture of step (A) to cause an aluminum halide to be formed which will in turn react with the alkali metal halide in the first mixture of step (A) to form an alkali metal haloaluminate;
   C. adding aluminum metal powder and one or more materials which will form the positive reactant of the cell to the resulting product of step (B) to form a second mixture, said one or more materials consisting essentially of a material selected from the group consisting of metals at least as noble as aluminum, metal-like elements, sulfur and mixtures thereof;
   D. providing a cell container having positive and negative reactant compartments, a solid member separating the cell compartments which is selectively-ionically conductive with respect to cations of the negative reactant material of the cell, and current collectors for each cell compartment;
   E. providing an electrical contact between the solid member and the current collector in the negative reactant compartment;
   F. while maintaining the cell at its operating temperature, electrically charging the second mixture of step (C) in the positive reactant compartment of the cell container whereby the negative reactant of the cell comprising a molten alkali metal is provided in the negative reactant compartment of the cell container and a positive reactant-electrolyte melt is provided in the positive reactant compartment of the cell container.

2. A method in accordance with claim 1 wherein the alkali metal halide of step (A) comprises sodium chloride, the halogen of step (B) is chlorine, the aluminum halide formed in step (B) comprises aluminum chloride, the alkali metal haloaluminate formed in step (B) comprises sodium chloroaluminate, the negative reactant provided in the negative reactant compartment of the cell in step (F) is sodium, and the positive reactant-electrolyte melt provided in the positive reactant compartment comprises an antimony chloride-sodium chloroaluminate melt.

3. A method in accordance with claim 1 wherein the alkali metal halide of step (A) comprises sodium chloride, the halogen of step (B) is chlorine, the aluminum halide formed in step (B) comprises aluminum chloride, the alkali metal haloaluminate formed in step B comprises sodium chloroaluminate, the negative reactant provided in the negative reactant compartment of the cell in step (F) is sodium, and the positive reactant-electrolyte melt provided in the positive reactant compartment comprises moltensodium chloride, molten aluminum chloride, and molten sulfur.

4. A method for fabricating a high-temperature secondary cell in which the electrolyte, the positive reactant or the negative reactant thereof is capable of reacting with moisture or oxygen contained in the ambient atmosphere comprising the steps of:
   A. preparing a first mixture comprising carbon, aluminum metal powder and a binder material;
   B. compacting the mixture of step (A);
   C. removing the binder material from the compacted mixture of step (B);
   D. preparing a second mixture comprised of the compacted mixture of step (C) and an alkali metal chloride;
   E. reacting chloride gas with the second mixture of step (D) while simultaneously heating the second mixture of step (D) to a temperature of at least 160°C. to cause aluminum chloride to be formed which will in turn react with the alkali metal chloride in the second mixture of the step (D) to form an alkali metal chloroaluminate;
   F. adding antimony powder and aluminum metal powder to the resulting product of step (E) to form a third mixture;
   G. providing a cell container having positive and negative reactant compartments, a solid member separating the cell compartments which is selectively-ionically conductive with respect to cations of the negative reactant of the cell and current collectors for each cell compartment;

H. providing an electrical contact between the solid member and the current collector in the negative reactant compartment;

I. while maintaining the cell at an operating temperature in the range of about 150° to 225°C., electrically charging the third mixture of step (F) in the positive reactant compartment of the cell container whereby a molten alkali metal is provided in the negative reactant compartment of the cell container and an antimony chloride — alkali metal chloroaluminate melt is provided in the positive reactant compartment of the cell container.

5. A method in accordance with claim 4 wherein the binder material of step (A) comprises ethylene glycol.

6. A method in accordance with claim 5 wherein the alkali metal chloride of step (D) is sodium chloride, the solid member of step G comprises beta alumina, the alkali metal provided in the negative reactant compartment of step (I) is sodium, and the alkali metal chloroaluminate comprises sodium chloroaluminate.

7. A method in accordance with claim 6 wherein step (E) is conducted directly in the positive reactant compartment of the cell.

8. A method for fabricating a high-temperature secondary cell in which the electrolyte, the positive reactant or the negative reactant thereof is capable of reacting with moisture or oxygen contained in the ambient atmosphere comprising the steps of:

A. preparing a first mixture comprising carbon, aluminum metal powder and a binder material;

B. compacting the mixture of step (A) to form pellets therefrom;

C. removing the binder from the pellets of step (B) by heating the pellets;

D. cooling the pellets of step (C) to room temperature;

E. preparing a second mixture comprised of the pellets of step (D) and an alkali metal halide;

F. loading the second mixture of step (E) into a container;

G. evacuating the air from the container;

H. introducing the halogen into the container to back-fill the container;

I. while continuing the introduction of halogen gas into the container, heating the container to a temperature to cause an aluminum halide to be formed which will in turn react with the alkali metal halide in the container to form an alkali metal haloaluminate;

J. continuing step (I) until substantially all of the aluminum metal in the container has reacted with the halogen;

K. cooling the container and the ingredients therein to room temperature and allowing the ingredients to solidify;

L. removing the solidified ingredients of step (K) from the container;

M. placing the ingredients of step (L) into the positive reactant compartment of a high-temperature secondary cell comprising a positive reactant compartment, a negative reactant compartment, a solid member separating the compartments which is selectively-ionically conductive with respect to cations of the negative reactant materials of the cell, and an electrical current collector for each compartment;

N. introducing aluminum metal powder and one or more materials which will form the positive reactant of the cell into the positive reactant compartment, said one or more materials consisting essentially of a material selected from the group consisting of sulfur, metals at least as noble as aluminum, and metal-like elements consisting of boron, silicon, selenium, arsenic, tellurium, antimony and mixtures thereof;

O. introducing an electrically conductive material into the negative reactant compartment for establishing electrical contact between the solid member and the current collector contained in the negative reactant compartment;

P. evacuating the air from the cell compartments;

Q. sealing the cell;

R. heating the compartments of the cell to its operating temperature;

S. electrically charging the cell by applying electrical energy to the current collectors thereof whereby ions of the alkali metal contained in the positive reactant compartment are transferred to the negative reactant compartment to provide the negative reactant molten alkali metal of the cell and a positive reactant-electrolyte melt is provided in the positive reactant compartment of the cell container.

9. A method in accordance with claim 8 wherein the binder material of step (A) comprises ethylene glycol.

10. A method in accordance with claim 9 wherein the alkali metal halide of step (E) comprises chloride, the halogen of step (H) comprises chlorine, the aluminum halide formed in step (I) comprises aluminum chloride, the alkali metal haloaluminate formed in step (B) is sodium chloroaluminate, antimony is the material selected from the group of step (N), the ions of the alkali metal contained in the positive reactant compartment which are transferred to the negative reactant compartment in step (S) comprise sodium ions, and the positive reactant-electrolyte melt is provided in the positive reactant compartment comprises an antimony chloride-sodium chloroaluminate melt.

11. A molten salt battery constructed in accordance with the method of claim 4.

* * * * *